(12) United States Patent
Nashio

(10) Patent No.: US 11,379,641 B2
(45) Date of Patent: Jul. 5, 2022

(54) METHOD AND DEVICE FOR ROTATION ANALYSIS OF ROTATING BODY

(71) Applicant: TOYO TIRE CORPORATION, Itami (JP)

(72) Inventor: Hiroshi Nashio, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 349 days.

(21) Appl. No.: 16/619,307

(22) PCT Filed: May 21, 2018

(86) PCT No.: PCT/JP2018/019513
§ 371 (c)(1),
(2) Date: Dec. 4, 2019

(87) PCT Pub. No.: WO2018/225491
PCT Pub. Date: Dec. 13, 2018

(65) Prior Publication Data
US 2020/0159979 A1    May 21, 2020

(30) Foreign Application Priority Data
Jun. 6, 2017 (JP) .............................. JP2017-111844

(51) Int. Cl.
*G06F 30/28* (2020.01)
*G06F 113/08* (2020.01)
*B60C 11/03* (2006.01)

(52) U.S. Cl.
CPC .............. *G06F 30/28* (2020.01); *B60C 11/03* (2013.01); *B60C 2011/0339* (2013.01); *G06F 2113/08* (2020.01)

(58) Field of Classification Search
CPC .......... G06F 30/20; G06F 30/25; G06F 30/23; G06F 30/367; G06F 30/398;
(Continued)

(56) References Cited

U.S. PATENT DOCUMENTS

| | | | |
|---|---|---|---|
| 6,430,993 B1 * | 8/2002 | Seta ........................ | B60C 11/00 73/146 |
| 2008/0154561 A1 * | 6/2008 | Shiraishi ................. | G06F 30/15 703/8 |

(Continued)

FOREIGN PATENT DOCUMENTS

| | | |
|---|---|---|
| EP | 1939774 A1 | 7/2008 |
| JP | 2004-338660 A | 12/2004 |

(Continued)

OTHER PUBLICATIONS

Grogger H et al: "Calculation of the Hydroplaning of a Deformable Smooth-Shaped and Longitudinally-Grooved Tire", Tire Science and Technology, vol. 25, No. 4, Oct. 1, 1997, pp. 265-287, XP001058905; Cited in Extended European Search Report dated Apr. 21, 2020. (23pages).

(Continued)

*Primary Examiner* — Steven W Crabb
(74) *Attorney, Agent, or Firm* — WHDA, LLP

(57) ABSTRACT

A method is disclosed for analyzing the rolling of a rotating body that will make it possible to simultaneously achieve reduction in computational cost and attainment of adequate analytic precision. The method includes: a step (S100, S101) in which a structural model is acquired; a step (S103) in, which a region Ar1 on a rotating body T at which finely divided computational mesh cells are established is made to come in contact with the ground, and rolling analysis processing is performed in which rolling is made to occur in an amount that is an angle corresponding to N minimum units (where N is a natural number not less than 1); and a step (S105) in which mapping processing is performed in which physical quantities at computational mesh cells as they exist following the rolling analysis processing are (Continued)

copied to corresponding computational mesh cells at a rolling start time.

6 Claims, 7 Drawing Sheets

(58) Field of Classification Search
CPC .. G06F 2111/00; G06F 2119/22; G06F 30/28; G06F 2113/08; G06F 30/15; B60C 11/03; B60C 2011/0339; B60C 99/006
See application file for complete search history.

(56) References Cited

U.S. PATENT DOCUMENTS

| | | | |
|---|---|---|---|
| 2010/0305746 A1* | 12/2010 | Shiraishi | G06F 30/23 700/199 |
| 2012/0296616 A1* | 11/2012 | Tsunoda | G06G 7/57 703/9 |
| 2013/0275104 A1 | 10/2013 | Imamura | |
| 2015/0073756 A1* | 3/2015 | Dorfi | G01M 17/022 703/2 |

FOREIGN PATENT DOCUMENTS

| | | |
|---|---|---|
| JP | 2006-293432 A | 10/2006 |
| JP | 2009-161115 A | 7/2009 |
| JP | 2011-54031 A | 3/2011 |
| JP | 2012-6522 A | 1/2012 |
| JP | 2012-181600 A | 9/2012 |
| JP | 2013-216269 A | 10/2013 |
| JP | 2015-103232 A | 6/2015 |
| JP | 2017-078895 A | 4/2017 |

OTHER PUBLICATIONS

Gall R et al: "Some Notes On the Finite Element Analysis of Tires", Tire Review, Babcox Publications, vol. 23, No. 3, Jan. 1, 1995, pp. 175-188, XP009002655; Cited in Extended European Search Report dated Apr. 21, 2020. (14pages).

Okano T et al: "A New Computational Procedure to Predict Transient Hydroplaning Performance of a Tire", Tire Science and Technology, vol. 29, No. 1, Jan. 1, 2001, pp. 2-22, XP001029986; Cited in Extended European Search Report dated Apr. 21, 2020. (21 pages).

Extended (Supplementary) European Search Report dated Apr. 21, 2020, issued in counterpart EP Application No. 18812813.6. (13 pages).

Office Action dated Feb. 22, 2021, issued in counterpart EP Application No. 18812813.6. (10 pages).

International Search Report dated Aug. 14, 2018, issued in counterpart International Application No. PCT/JP2018/019513 (5 pages).

Notification of Transmittal of Translation of the International Preliminary Report on Patentabililty (Form PCT/IB/338) issued in counterpart International Application No. PCT/JP2018/019513 dated Dec. 19, 2019 with Forms PCT/IB/373 and PCT/ISA/237. (14 pages).

* cited by examiner

METHOD AND DEVICE FOR ROTATION ANALYSIS OF ROTATING BODY

TECHNICAL FIELD

The present invention relates to a method and device for analyzing the rolling of a rotating body.

BACKGROUND ART

In recent years, simulations for analyzing fluid around rotating bodies have been proposed for the purpose of evaluating such aspects of performance as water shedding performance and performance with respect to noise such as may be caused by fluid (air, water, etc.) around tires and other such rotating bodies dining rolling of the rotating body. As such simulation method, a computerized model is employed to simulate the rolling of a rotating body over a road surface, at which time a physical quantity pertaining to the fluid around the rotating body being modeled is calculated, the physical quantity pertaining to the fluid being used to evaluate aspects of performance such as performance with respect to water shedding and noise. As related art, Patent References Nos. 1 and 2 have been disclosed.

As another analytic method, a structural analysis simulation has been proposed in which rolling is simulated at a finite element model of a tire having grooves at the tread to calculate a physical quantity at the interior of the tire that arises due to contact with the road surface. Such analyses of the rolling of rotating bodies include both analyses that employ fluidic models and analyses that employ structural models.

PRIOR ART REFERENCES

Patent References

Patent Reference No. 1: Japanese Patent Application Publication Kokai No. 2013-216269
Patent Reference No. 2: Japanese Patent Application Publication Kokai No. 2012-6522

SUMMARY OF INVENTION

Problem to be Solved by Invention

In the context of either the fluid analytic or the structural analytic type of simulation, in causing the rotating body to roll for the purposes of performing rolling analysis, the model that is used is represented in terms of computational mesh cells that are on the order of the same size at all locations along the circumference of the rotating body. To improve analytic precision, it is necessary to more finely divide the computational mesh cells throughout the entire model, but more finely dividing the computational mesh cells will cause computational cost to increase. Conversely, if computational mesh cells are made more coarse, while this will decrease computational cost, it will also cause degradation of analytic precision. Thus, analytic precision and computational cost are in a mutually conflicting relationship.

The present invention was conceived in view of such problems, it being an object thereof to provide a method and device for analyzing the rolling of a rotating body that will make it possible to simultaneously achieve reduction in computational cost and attainment of adequate analytic precision.

Means for Solving Problem

To achieve the foregoing object, the present invention employs means as described below.

In other words, according to the present invention, there is provided a method for analyzing rolling of a rotating body is a method executed by a computer, comprising:

a step in which a structural model having, a plurality of computational mesh cells that represent the rotating body or a fluidic model having a plurality of computational mesh cells that represent the space around the rotating body is acquired, the model being such that surface shape of the rotating body is of such shape that a plurality of surface shapes constituting minimum units are arranged in repeating fashion along a circumferential direction, and the model being such that computational mesh cells at a region which is a portion of the model are established in more finch divided fashion than computational mesh cells at another region;

a step in which that region on the rotating body at which finely divided computational mesh cells are established is made to come in contact with the ground, and rolling analysis processing is performed in which rolling is made to occur in an amount that is an angle corresponding to N minimum units (where N is a natural number not less than 1); and a step in which mapping processing is performed in which physical quantities at computational mesh cells as they exist following the rolling analysis processing are copied to corresponding computational mesh cells at a rolling start time;

wherein the rolling analysis processing employing computational mesh cells occurring after the mapping processing, and the mapping processing occurring after the rolling analysis processing, are performed in repeated fashion until a prescribed analysis end condition is met.

Thus, because the contact patch is made to roll by that portion of region Ar1, where finely divided computational mesh cells are established, which corresponds to N minimum units, the surface shapes of rotating body T at the rolling start time and at the rolling end time will match. Because in performing rolling analysis the physical quantities at the rolling end time are copied to the computational mesh cells at the rolling start time, rolling being carried out in an amount corresponding to N minimum units, and the physical quantities continuing to be retained, this being equivalent to the situation that would exist were one to go back by an amount corresponding to N minimum units and thereafter again cause rolling to occur by an amount corresponding to N minimum units, the region that comes in contact with the ground will correspond to N minimum units. Therefore, whereas it was conventionally necessary in the context of contact patch rolling analysis that finely divided computational mesh cells be present at all locations along the circumference of rotating body T, with this method it is sufficient to cause finely divided computational mesh cells to be established only in a region corresponding to N minimum units, making it possible to simultaneously achieve reduction in computational cost and attainment of adequate analytic precision.

EMBODIMENTS FOR CARRYING OUT INVENTION

Below, an embodiment of the present invention is described with reference to the drawings.
Device for Analyzing Rolling of Rotating Body Rolling analysis device 1 in accordance with the present embodiment simulates the behavior of an analytic target occurring as a result of the rolling of a rotating body. The present embodiment will be described in terms of an example in which a fluidic model having a plurality of computational mesh cells that represent the space around a tire constituting a rotating body is used to calculate the physical quantity for each computational mesh cell in the space.

Figure 1:
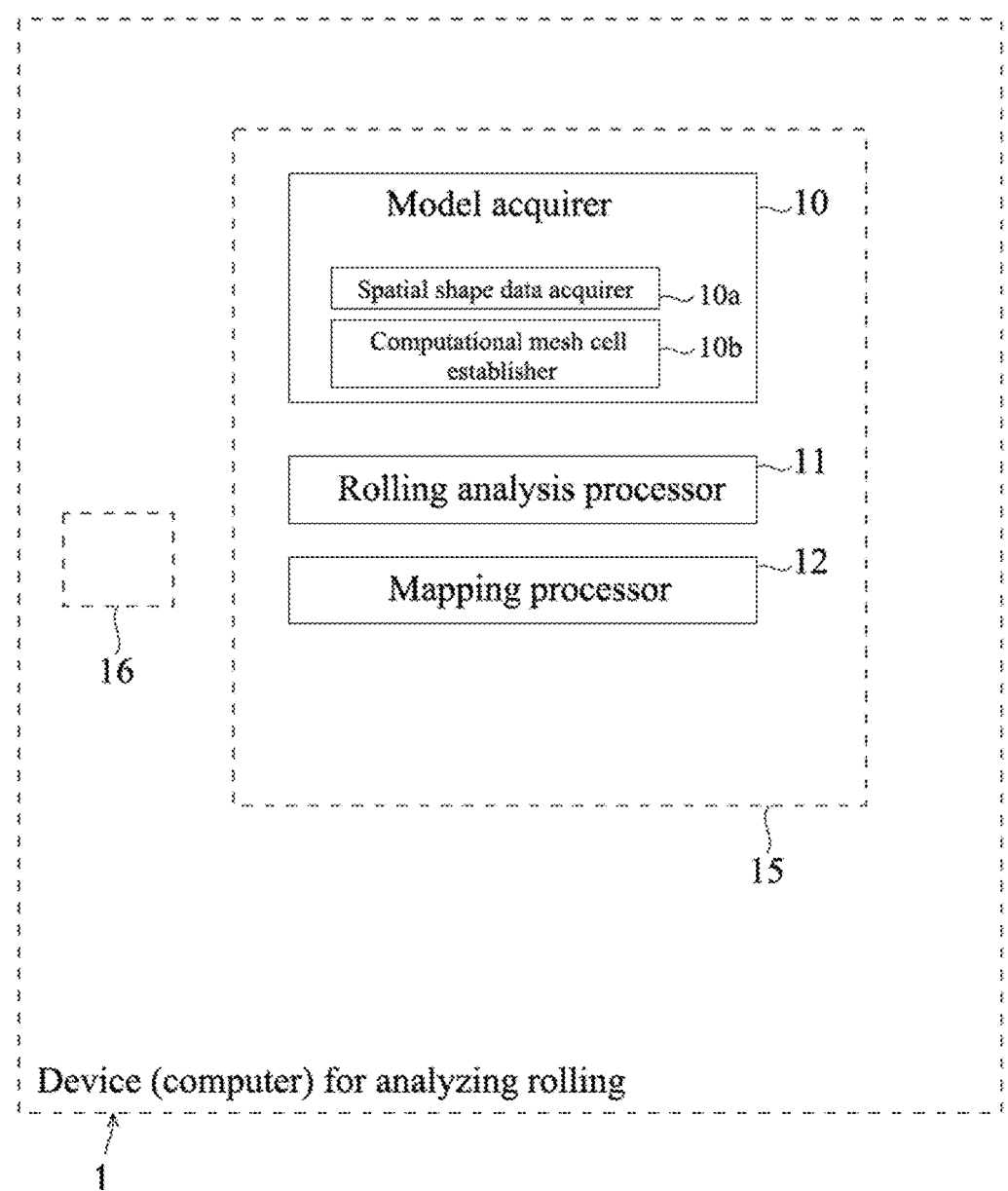
[FIG. 1] Block diagram showing a device for analyzing the rolling of a rotating body in accordance with the present invention.

As shown in FIG. 1, device 1 has model acquirer 10, rolling analysis processor 11, and mapping processor 12. Model acquirer 10 of the present embodiment, which is constituted in such fashion as to acquire a fluidic model, may have spatial shape data acquirer 10a, and computational mesh cell establisher 10b. These respective units 10 through 14 are implemented in cooperative fashion in software and hardware as a result of execution of the processing routine at FIG. 7 which has been previously stored by processor(s) 15 at personal computer(s) and/or other such information processing apparatus(es) equipped with CPU(s) and/or other such processor(s) 15, memory or memories 16, various interface(s), and so forth.

Figure 2:
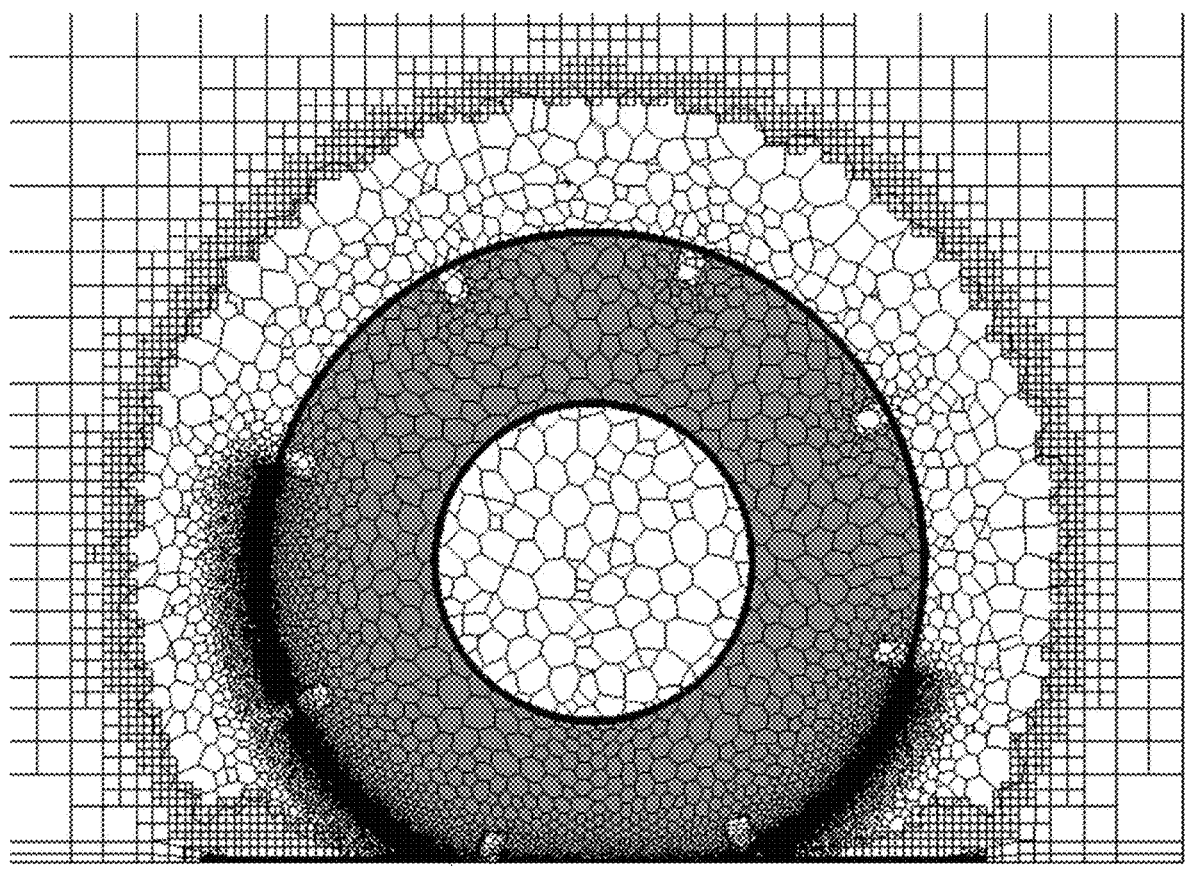
[FIG. 2] Drawing showing fluidic model representing the space around a rotating body at a rolling start time.
Figure 3:
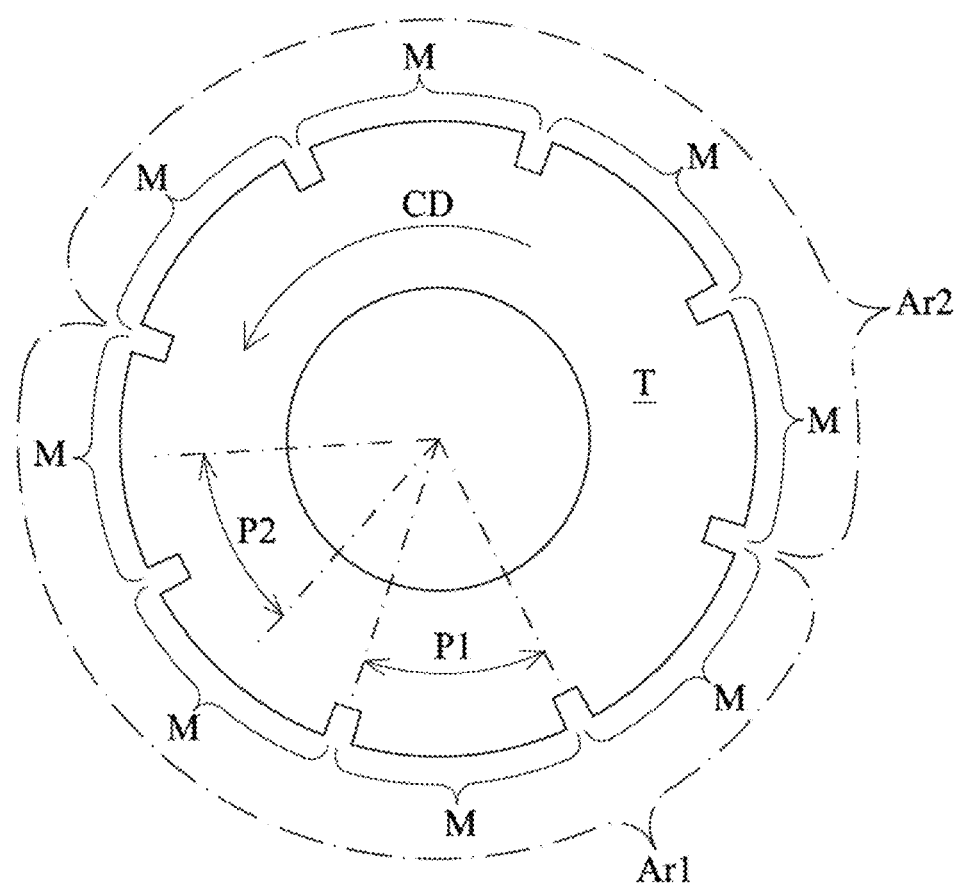
[FIG. 3] Drawing to assist in description of the model shown in FIG. 2.

Model acquirer 10 shown in FIG. 1 acquires a fluidic model having a plurality of computational mesh cells that represent the space around rotating body T as, shown in FIG. 2. FIG. 2 and FIG. 3 are sectional views of sections perpendicular to the rotational axis. The physical properties, physical model, and other such calculation conditions necessary for calculating the behavior of the fluid and/or the rotating body itself are established at the computational mesh cells. As shown in FIG. 3, the surface shape of a rotating body in accordance with this fluidic model is of such shape that a plurality of surface shapes constituting minimum units M are arranged in repeating fashion along circumferential direction CD. As indicated with reference to FIG. 2 and FIG. 3, the computational mesh cells at region Ar1, which is a portion of the model, are established in more finely divided fashion than the computational mesh cells at another region Ar2. Although region Ar1 in the example of the drawing is established in such fashion that finely divided computational mesh cells are present everywhere along one-half of the circumference of rotating body T, there is no limitation with respect thereto. So long as it does not extend to the full circumference of rotating body T, it may be of greater extent than this, or it may be of smaller extent than this. The lower limit of the region Ar1 at which finely divided computational mesh cells are present that may be established is the angular amount corresponding to one minimum unit, the reason for this being that causing the rotating body to roll by an amount that is the angle corresponding to one minimum unit will cause surface shapes to match. Describing the lower limit by way of the example at same drawing, this may be the range P1 that coincides with one minimum unit, or this may be the range P2 that corresponds to one minimum unit but that straddles a plurality of adjacent minimum units.

Model acquirer 10 of the present embodiment generates and acquires fluidic model data. More specifically, spatial shape data acquirer 10a acquires data pertaining to the shape of the space around rotating body T, and computational mesh cell establisher 10b establishes the sizes of the computational mesh cells that represent the space in such fashion as to cause the computational mesh cells at region Ar1, which is one portion thereof, to be more finely divided than the computational mesh cells at another region Ar2, as shown in FIG. 2 and FIG. 3. A constitution may of course be adopted in which model acquirer 10 acquires fluidic model data from internal and/or external storage.

Figure 4:
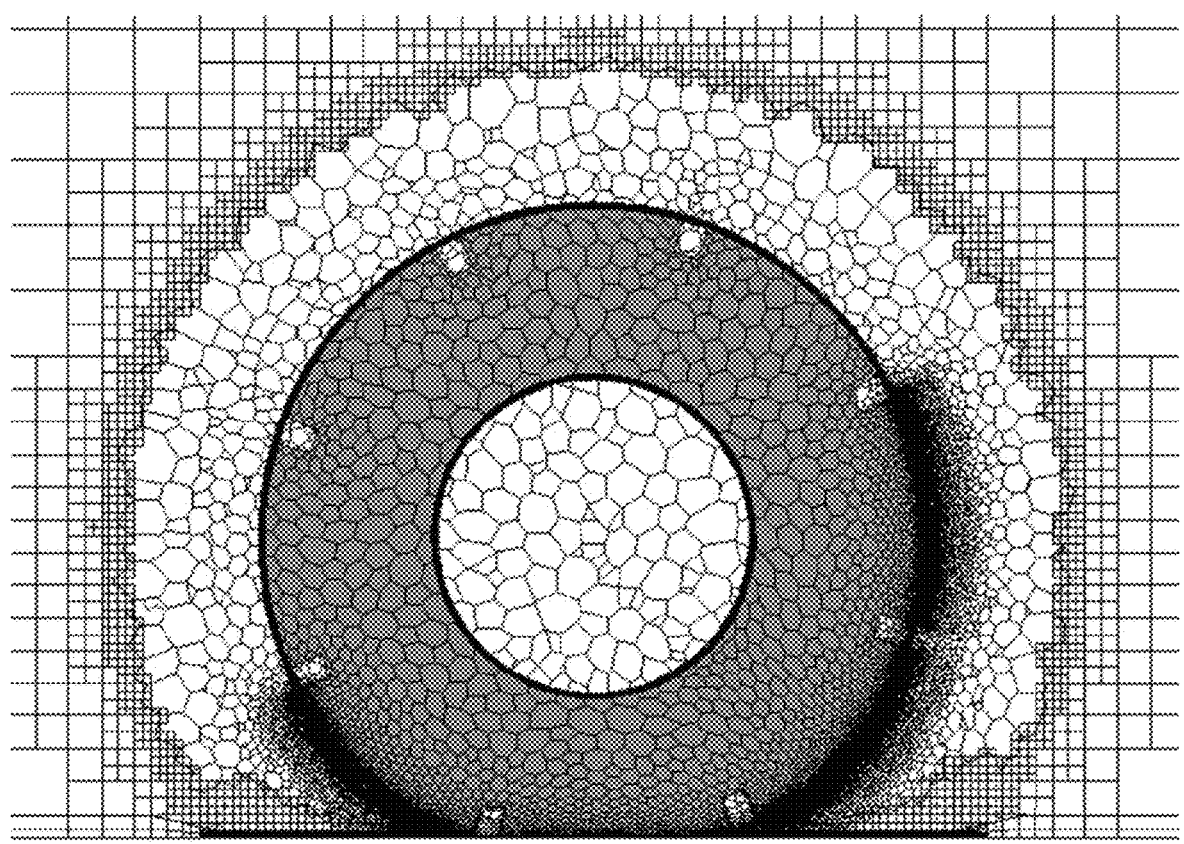
[FIG. 4] Drawing showing model at a rolling end time reached as a result of causing rolling to occur in an amount corresponding to one minimum unit in the counterclockwise direction from the rolling start time shown in FIG. 2.

Rolling, analysis processor 11 shown in FIG. 1 causes that region Ar1 on rotating body T at which finely divided computational mesh cells are established to come in contact with the ground, and performs rolling analysis processing in which rolling is made to occur in an amount that is an angle corresponding to N minimum units (where N is a natural number not less than 1). Because rolling analysis processing in accordance with fluidic models and rolling analysis processing in accordance with structural models are known, detailed description thereof will be omitted. Whereas it is ordinarily the case that the rotating body is made to roll without regard to any minimum unit, in accordance with the present application rolling is only made to occur in amounts that are angles corresponding to N minimum units. N=1 is established in advance in accordance with the present embodiment, FIG. 2 showing the model at a rolling start time, and FIG. 4 showing the model at a rolling end time reached as a result of causing rolling to occur in an amount corresponding to one minimum unit in the counterclockwise direction from the state shown in FIG. 2. The maximum value for N is such that this may be established as desired within a range that does not exceed region Ar1 at which finely divided computational mesh cells are established. So that it may be used during the processing that is carried out thereafter, it is efficient to cause the model data (including computational mesh cells) at the rolling start time which is shown in FIG. 2 to be separately saved to memory.

Figure 5:
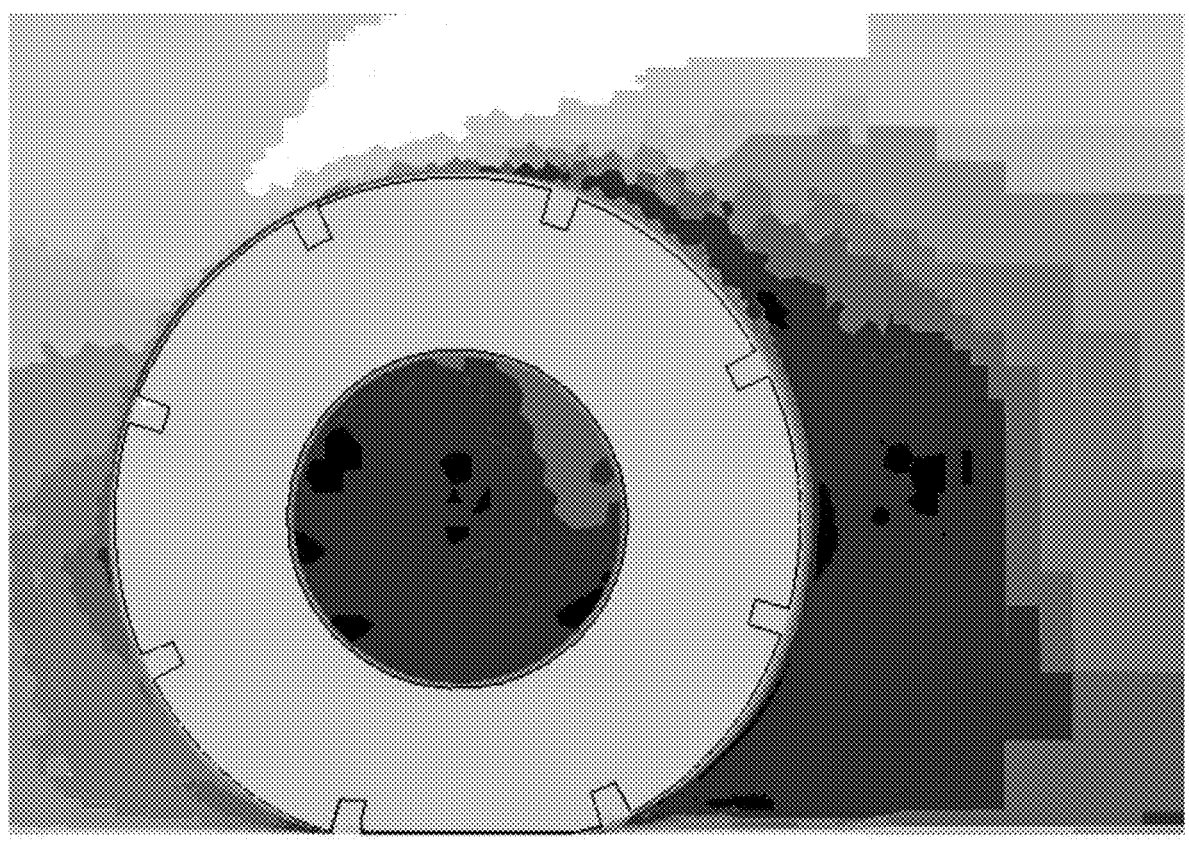
[FIG. 5] Drawing in which the value of a physical quantity at computational mesh cells at a rolling start time is indicated by color.
Figure 6:
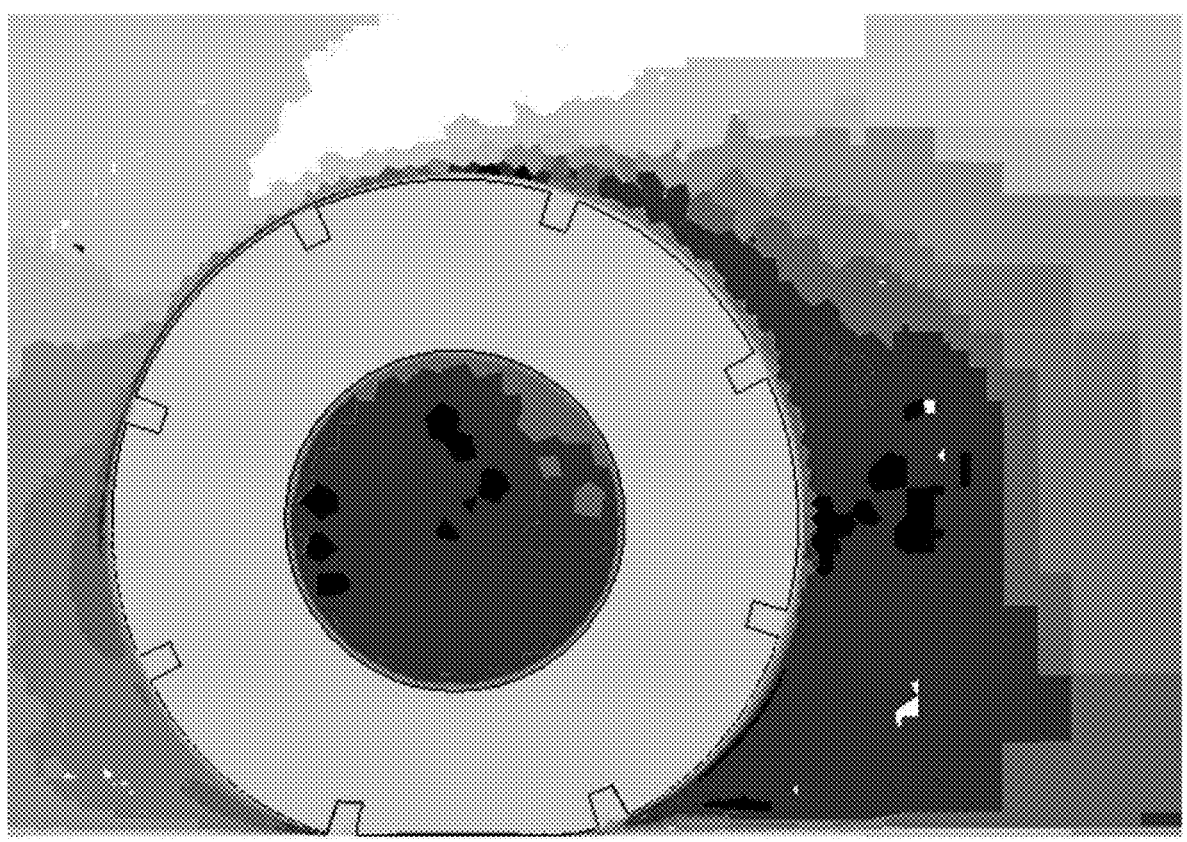
[FIG. 6] Drawing in which the value of a physical quantity at computational mesh cells at a rolling end time is indicated by color.

Mapping processor 12 shown in FIG. 1 performs mapping processing in which the physical quantities at computational mesh cells as they exist following rolling analysis processing are copied to the corresponding computational mesh cells at the rolling start time. By so doing, the physical quantities at the computational mesh cells at the rolling end time shown in FIG. 4 and FIG. 6 are stored at the computational mesh cells at the rolling start time shown in FIG. 2 and FIG. 5 for the next rolling angle, allowing the physical quantities in the space to be inherited when fluid analysis is being carried out, or the physical quantities within the rotating body to be inherited when structural analysis is being carried out, or the physical quantities within the rotating body to be inherited when structural analysis is being carried out. It is sufficient that the mapping processing be such as to cause these to be associated therewith in correspondence to the locations of the computational mesh cells. Where the locations of the computational mesh cells at the rolling start time and the rolling end time are identical, the physical quantities at computational mesh cells having mutually identical locations may be copied as is. Where the computational mesh cells at the rolling start time and the rolling end time are not identical, the correspondence therebetween may be determined based on the degree to which they overlap in space, and the physical quantities may be copied in apportioned fashion.

Rolling analysis processing employing computational mesh cells occurring after mapping processing, and mapping processing occurring after rolling analysis processing, are performed in repeated fashion until prescribed analysis end conditions are met.

Method for Analyzing Rolling

Figure 7:
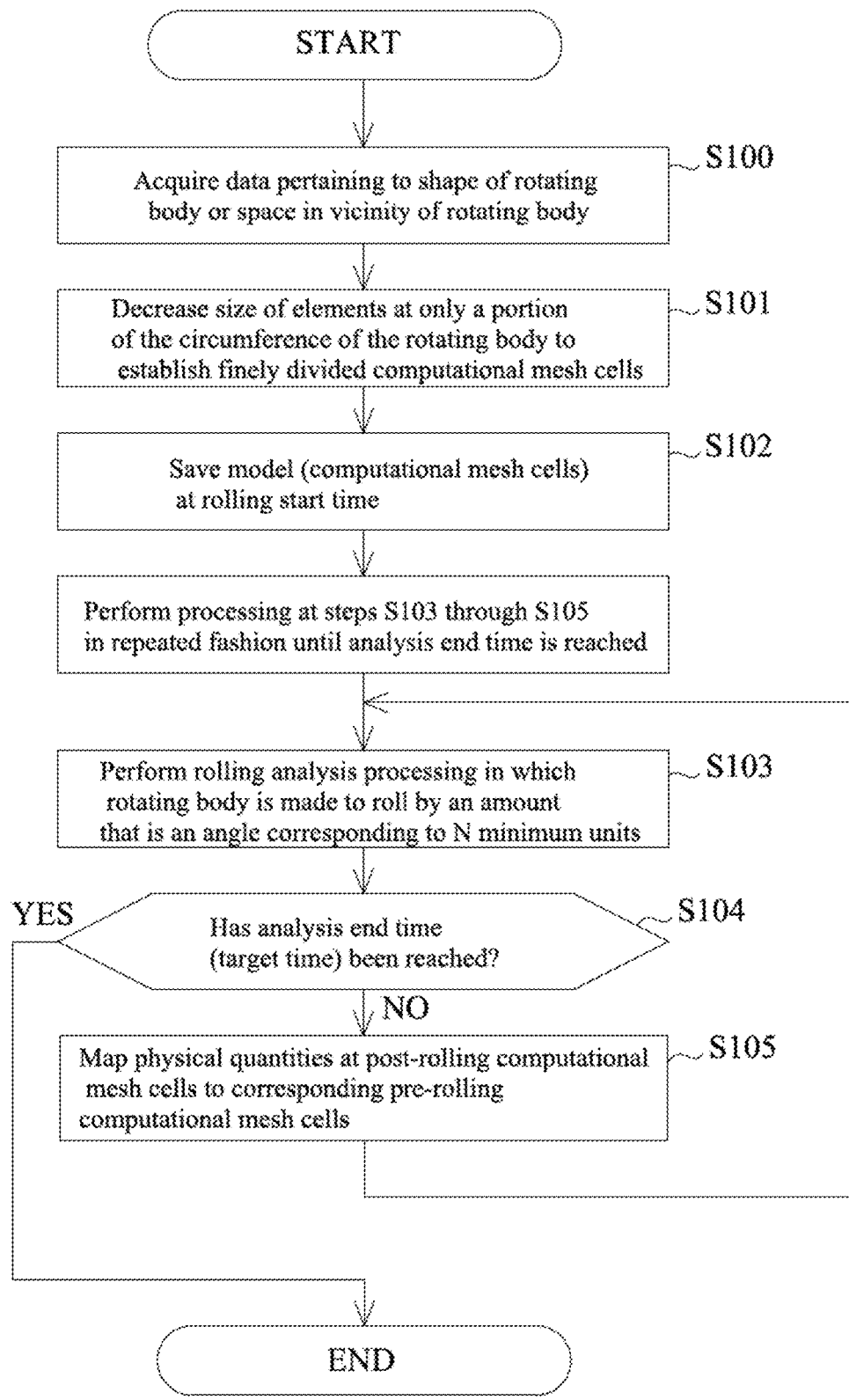
[FIG. 7] Flowchart showing method for analyzing rolling associated with the present invention.

A method for using the foregoing device 1 to analyze rolling around a tire will now be described using FIG. 7.

First, at steps S100 and S102, model acquirer 10 acquires a structural model having a plurality of computational mesh cells that represent rotating body T or a fluidic model having a plurality of computational mesh cells that represent the space around rotating body T, the model being such that the surface shape of rotating body T is of such shape that a plurality of surface shapes constituting minimum units M are arranged in repeating fashion along circumferential direction CD, and the model being such that computational mesh cells at region Ar1, which is a portion of the model, are established in more finely divided fashion than the computational mesh cells at another region Ar2.

In accordance with the present embodiment, at step S100, spatial shape data acquirer 10*a* acquires data pertaining to the shape of the space around rotating body T. At step S101, computational mesh cell establisher 10*b* establishes the sizes of the computational mesh cells that represent the space in such fashion as to cause the computational mesh cells at region Ar1, which is one portion thereof to be more finely divided than the computational mesh cells at another region Ar2.

Next, at step S102, the model (computational mesh cells) at a rolling start time is saved to memory.

Next, the processing at steps S103 through S105 is performed in repeated fashion until an analysis end time (target time) is reached (S104: YES).

Next, at step S103, rolling analysis processor 11 causes that region Ar1 on the rotating body at which finely divided computational mesh cells are established to come in contact with the ground, and performs rolling analysis processing in which rolling is made to occur in an amount that is an angle corresponding to N minimum units (where N is a natural number not less than 1).

Next, at step S104, evaluation is carried out to determine whether the analysis end time (target time) has been reached, processing being terminated if it is determined that the analysis end time (target time) has not been reached, then at the next step, which is step S105, the model at the rolling end time that was saved is copied, and mapping processor 12 performs mapping processing in which the physical quantities at computational mesh cells as they exist following rolling analysis processing (see FIG. 4 and FIG. 6) are copied to the corresponding computational mesh cells at the rolling start time (see FIG. 2 and FIG. 5) for the next rolling angle, and processing returns to step S103.

That is, rolling analysis processing employing computational mesh cells occurring after mapping processing, and mapping processing occurring after rolling analysis processing, are performed in repeated fashion until prescribed analysis end conditions are met (the target time has been reached).

Note that while a fluidic model is used to calculate physical quantities pertaining to a fluid in the present embodiment, there is no limitation with respect thereto. For example, this may be applied to structural calculation in which a structural model having a plurality of computational mesh cells that represent a rotating body is used to calculate a physical quantity or quantities (stress, strain, displaced state, velocity, etc.) at the interior of the rotating body for each computational mesh cell.

As described above, a method for analyzing rolling of a rotating body in accordance with the present embodiment is a method executed by a computer, including:

a step (S100, S101) in which a structural model having a plurality of computational mesh cells that represent the rotating body T or a fluidic model having a plurality of computational mesh cells that represent the space around the rotating body T is acquired, the Model being such that surface shape of the rotating body T is of such shape that a plurality of surface shapes constituting minimum units M are arranged in repeating fashion along a circumferential direction CD, and the model being such that computational mesh cells at a region Ar1 which is a portion of the model are established in more finely divided fashion than computational mesh cells at another region Ar2;

a step (S103) in which that region Ar1 on the rotating body T at which finely divided computational mesh cells are established is made to come in contact with the ground, and rolling analysis processing is performed in which rolling is made to occur in an amount that is an angle corresponding to N minimum units (where N is a natural number not less than 1); and a step (S105) in which mapping processing is performed in which physical quantities at computational mesh cells as they exist following the rolling analysis processing are copied to corresponding computational mesh cells at a rolling start time;

wherein the rolling analysis processing (S103) employing computational mesh cells occurring after the mapping processing, and the mapping processing (S105) occurring after the rolling analysis processing, are performed in repeated fashion until a prescribed analysis end condition is met.

A device 1 for analyzing rolling of a rotating body in accordance with the present embodiment has a model acquirer 10 that acquires a structural model having a plurality of computational mesh cells which represent the rotating body T or a fluidic model having a plurality of computational mesh cells which represent the space around the rotating body T, the model being such that surface shape of the rotating body T is of such shape that a plurality of surface shapes constituting minimum units M are arranged in repeating fashion along a circumferential direction CD, and the model being such that computational mesh cells at a region Ar1 which is a portion of the model are established in more finely divided fashion than computational mesh cells at another region Ar2;

a rolling analysis processor 11 that causes that region Ar1 on the rotating body at which finely divided computational mesh cells are established to come in contact with the ground, and that performs rolling analysis processing in which rolling is made to occur in an amount that is an angle corresponding to N minimum units (where N is a natural number not less than 1); and a mapping processor 12 that performs mapping processing in which physical quantities at computational mesh cells as they exist following the rolling analysis processing are copied to corresponding computational mesh cells at a rolling start time;

wherein the rolling analysis processing employing computational mesh cells occurring after the mapping processing, and the mapping processing occurring after the rolling analysis processing, are performed in repeated fashion until a prescribed analysis end condition is met.

Thus, because the contact patch is made to roll by that portion of region Ar1, where finely divided computational mesh cells are established, which corresponds to N minimum units, the surface shapes of rotating body T at the rolling start time and at the rolling end tune will match. Because in performing rolling analysis the physical quantities at the rolling end time are copied to the computational mesh cells at the rolling start time, rolling being carried out in an amount corresponding to N minimum units, and the physical quantities continuing to be retained, this being equivalent to the situation that would exist were one to go back by an amount corresponding to N minimum units and thereafter again cause rolling to occur by an amount corresponding to N minimum units, the region that comes in contact with the ground will correspond to N minimum units. Therefore, whereas it was conventionally necessary in the context of contact patch rolling analysis that finely divided computational mesh cells be present at all locations along the circumference of rotating body T, with this method it is sufficient to cause finely divided computational mesh cells to be established only in a region corresponding to N minimum units, making it possible to simultaneously achieve reduction in computational cost and attainment of adequate analytic precision.

In the method in accordance with the present embodiment, the step (S100, S101) in which the model is acquired is such that the fluidic model is acquired, and comprises a step (S100) in which data pertaining to a shape of a space around the rotating body T is acquired; and a step (S101) in which sizes of computational mesh cells that represent the space are established in such fashion as to cause computational mesh cells at a region Ar1 which is one portion thereof to be more finely divided than computational mesh cells at another region Ar2.

A device in accordance with the present embodiment, the model acquirer 10 is constituted so as to acquire the fluidic model, and has a spatial shape data acquirer 10a that acquires data pertaining to a shape of a space around the rotating body; and a computational mesh cell establisher 10b that establishes sizes of computational mesh cells that represent the space in such fashion as to cause computational mesh cells at a region Ar1 which is one portion thereof to be more finely divided than computational mesh cells at another region Ar2.

While there is little meaning in performing time-dependent simulation of rolling analysis with a structural model of rotating body T, because with fluid analysis it is impossible to obtain meaningful physical quantities unless tune-dependent simulation is carried out, performing the present method is effective in the context of fluidic models.

In accordance with the present embodiment, the rotating body T is a tire having a groove that intersects a tire circumferential direction.

By so doing, it will be possible to obtain physical quantities arising at a tire and/or physical quantities pertaining to a fluid around a tire.

A device for analyzing rolling of a rotating body has a processor 15 and a memory 16 for storing instructions capable of being executed by the processor 15. The processor 15 is constituted in such fashion as to cause a structural model having a plurality of computational mesh cells that represent the rotating body T or a fluidic model having a plurality of computational mesh cells that represent the space around the rotating body to be acquired, the model being such that surface shape of the rotating body T is of such shape that a plurality of surface shapes constituting minimum units M are arranged in repeating fashion along a circumferential direction CD, and the model being such that computational mesh cells at a region Ar1 which is a portion of the model are established in more finely divided fashion than computational mesh cells at another region Ar2;

that region Ar1 on the rotating body at which finely divided computational mesh cells are established to come in contact with the ground, and rolling analysis processing (S103) to be performed in which rolling is made to occur in an amount that is an angle corresponding to N minimum units (where N is a natural number not less than 1): and mapping processing (S105) to be performed in which physical quantities at computational mesh cells as they exist following the rolling analysis processing are copied to corresponding computational mesh cells at a rolling start time. The processor 15 is constituted in such fashion as to cause the rolling analysis processing (S103) employing computational mesh cells occurring after the mapping processing, and the mapping processing (S105) occurring after the rolling analysis processing, to be performed in repeated fashion until a prescribed analysis end condition is met.

Processor 15 may be implemented by one or more application specific integrated circuits(s) (ASIC), digital signal processor(s) (DSP), digital signal processing device(s) (DSPD), programmable logic device(s) (PLD), field programmable gate array(s) (FPGA), controller(s), microcontroller(s), microprocessor(s), and/or or other such electronic component(s).

Program(s) associated with the present embodiment are program(s) for causing the foregoing method(s) to be executed by computer(s).

The operation and effects provided by the foregoing method(s) can also be obtained as a result of execution of such program(s).

While embodiments in accordance with the present disclosure have been described above with reference to the drawings, it should be understood that the specific constitution thereof is not limited to these embodiments. The scope of the present disclosure is as indicated by the claims and not merely as described at the foregoing embodiments, and moreover includes all variations within the scope of or equivalent in meaning to that which is recited in the claims.

Structure employed at any of the foregoing embodiment(s) may be employed as desired at any other embodiment(s). The specific constitution of the various components is not limited only to the foregoing embodiment(s) but admits of any number of variations without departing from the gist of the present disclosure.

EXPLANATION OF REFERENCE NUMERALS

10 Model acquirer
11 Rolling analysis processor
12 Mapping processor
15 Processor
16 Memory
T Rotating body (tire)
Surface shape minimum unit
Ar1 Region at which finely divided computational mesh cells are present
Ar2 Region at which coarsely divided computational mesh cells are present

The invention claimed is:

1. A method for analyzing rolling of a rotating body on a ground by one or more processors, comprising:
a step in which at least one of a structural model having a plurality of computational mesh cells that represent the rotating body and a fluidic model having a plurality of computational mesh cells that represent the space around the rotating body is acquired, the model being such that a surface shape of the rotating body is of such shape that a plurality of surface shapes constituting minimum units of same shaped portions of the rotating body are arranged in repeating fashion along a circumferential direction, and the model being such that computational mesh cells at a region encompassing the rotating body on the ground which is a portion of the model are established in more finely divided fashion than computational mesh cells at another region, the more finely divided fashion including at least a size of the computation mesh cells in a circumferential direction of the rotating body relating to the minimum units of same shaped portions of the rotating body between the region and the another region;
a step in which the region on the rotating body at which finely divided computational mesh cells are established is made to come in contact with the ground, and rolling analysis processing is performed in which rolling is made to occur in an amount that is an angle corresponding to N of the minimum units in the region (where N is a natural number not less than 1); and
a step in which mapping processing is performed in which physical quantities at computational mesh cells in the region as they exist following the rolling analysis processing are copied to corresponding computational mesh cells in the region at a rolling start time for the rolling analysis for another of the rolling in the amount of the angle,
wherein the rolling analysis processing employing computational mesh cells occurring after the mapping processing, and the mapping processing occurring after the rolling analysis processing, are performed in repeated fashion until a prescribed analysis end condition is met.

2. The method according to claim 1 wherein the rotating body is a tire having a groove that intersects a tire circumferential direction.

3. A device for analyzing rolling of a rotating body on a ground, comprising:
a model acquirer processor that acquires at least one of a structural model having a plurality of computational mesh cells which represent the rotating body and a fluidic model having a plurality of computational mesh cells which represent the space around the rotating body, the model being such that surface shape of the rotating body is of such shape that a plurality of surface shapes constituting minimum units of same shaped portions of the rotating body are arranged in repeating fashion along a circumferential direction, and the model being such that computational mesh cells at a region encompassing the rotating body on the ground which is a portion of the model are established in more finely divided fashion than computational mesh cells at another region, the more finely divided fashion including at least a size of the computation mesh cells in a circumferential direction of the rotating body relating to the minimum units of same shaped portions of the rotating body between the region and the another region;
a rolling analysis processor that causes the region on the rotating body at which finely divided computational mesh cells are established to come in contact with the ground, and that performs rolling analysis processing in which rolling is made to occur in an amount that is an angle corresponding to N of the minimum units in the region (where N is a natural number not less than 1); and
a mapping processor that performs mapping processing in which physical quantities at computational mesh cells in the region as they exist following the rolling analysis processing are copied to corresponding computational mesh cells in the region at a rolling start time for the rolling analysis for another of the rolling in the amount of the angle,
wherein the rolling analysis processing employing computational mesh cells occurring after the mapping processing, and the mapping processing occurring after the rolling analysis processing, are performed in repeated fashion until a prescribed analysis end condition is met.

4. The device according to claim 3 wherein the rotating body is a tire having a groove that intersects a tire circumferential direction.

5. A device for analyzing rolling of a rotating body on a ground, comprising:
a processor; and
a memory for storing instructions capable of being executed by the processor,
wherein the processor is is configured to execute the instructions to cause:
at least one of a structural model having a plurality of computational mesh cells that represent the rotating body and a fluidic model having a plurality of computational mesh cells that represent the space around the rotating body to be acquired, the model being such that surface shape of the rotating body is of such shape that a plurality of surface shapes constituting minimum units of same shaped portions of the rotating body are arranged in repeating fashion along a circumferential direction, and the model being such that computational mesh cells at a region encompassing the rotating body on the ground which is a portion of the model are established in more finely divided fashion than computational mesh cells at another region, the more finely divided fashion including at least a size of the computation mesh cells in a circumferential direction of the rotating body relating to the minimum units of same shaped portions of the rotating body between the region and the another region;
the region on the rotating body at which finely divided computational mesh cells are established to come in contact with the ground, and rolling analysis processing to be performed in which rolling is made to occur in an amount that is an angle corresponding to N of the minimum units in the region (where N is a natural number not less than 1); and mapping processing to be performed in which physical quantities at computational mesh cells in the region as they exist following the rolling analysis processing are copied to corresponding computational mesh cells in the region at a rolling start time for the rolling analysis for another of the rolling in the amount of the angle, wherein the processor is constituted in such fashion as to cause the rolling analysis processing employing computational mesh cells occurring after the mapping processing, and the mapping processing occurring after the rolling analysis processing, to be performed in repeated fashion until a prescribed analysis end condition is met.

6. The device according to claim 5, wherein the rotating body is a tire having a groove that intersects a tire circumferential direction.

* * * * *